United States Patent [19]

Clostermeyer et al.

[11] Patent Number: 4,566,380
[45] Date of Patent: Jan. 28, 1986

[54] ROUND BALING PRESS FOR AGRICULTURAL PRODUCTS

[75] Inventors: Gerhard Clostermeyer, Gütersloh; Werner Müller, Harsewinkel, both of Fed. Rep. of Germany

[73] Assignee: Claas Ohg, Harsewinkel, Fed. Rep. of Germany

[21] Appl. No.: 601,152

[22] Filed: Apr. 16, 1984

[30] Foreign Application Priority Data

Apr. 20, 1983 [DE] Fed. Rep. of Germany ....... 3314314

[51] Int. Cl.[4] ............................ B30B 3/04; B30B 15/32
[52] U.S. Cl. ....................................... 100/89; 100/99; 56/341
[58] Field of Search ............... 100/88, 89, 99; 56/341, 56/342, 343, 344

[56] References Cited

U.S. PATENT DOCUMENTS

| 4,206,587 | 6/1980 | Freimuth et al. | 56/341 |
| 4,389,930 | 6/1983 | Rutschilling | 100/99 X |
| 4,406,221 | 9/1983 | Parrish et al. | 100/88 |
| 4,470,247 | 9/1984 | Mast | 100/88 X |
| 4,483,247 | 11/1984 | Coeffic | 100/88 |

FOREIGN PATENT DOCUMENTS 3118663 12/1982 Fed. Rep. of Germany .

Primary Examiner—Peter Feldman
Attorney, Agent, or Firm—Michael J. Striker

[57] ABSTRACT

A round baling press for agricultural stalk products has a pressing chamber limited by a stationary front housing part and a movable rear housing part which is turnable for discharge of a finished bale about a horizontal axis and is provided with a sensing device which senses whether the turning region of the rear housing part is free of bale after its discharge to prevent turning of the rear housing part when the bale is still in its turning region.

8 Claims, 2 Drawing Figures

4,566,380

ROUND BALING PRESS FOR AGRICULTURAL PRODUCTS

BACKGROUND OF THE INVENTION

The present invention relates to a round baling press for agricultural stalk products with a cylindrical housing composed of a front stationary housing and a rear turnable housing together bounding a pressing chamber.

A round baling press of the above mentioned general type are known in the art. In a known round baling press the rear housing part is turnable about a horizontal axis relative to the front housing part with the aid of a hydraulic device articulately connected with both housing parts. The rear housing part is movable between a closed position in which it approaches the front housing part, and an open position in which it is remote from the latter to discharge the bails. In the known round baling presses the product to be harvested is lifted from the ground by a collecting device and supplied via a pulling gap into the pressing chamber of the housing in which rotatable elements form a round bale. After reaching a desired diameter or a desired density the product supply is interrupted and the round bale is wound around by a binding rope in a helical manner. Until the final point of the manufacture of each round bale, the turnable rear housing part is locked with the immovable front housing part. Subsequently, the rear housing part is turned out by the hydraulic device including hydraulic cylinder-and-piston units and the finished round bale is discharged.

DE-OS No. 3,118,663 discloses a round baling press in which, in order to guarantee that the bales are produced with approximately uniform density and size, the rear housing part during the winding step under growing pressing pressure is controlled by transmission elements from an acoustic or optical indicating device for the pressure in the pressing chamber. Thereby the tractor driver becomes aware of the time the pressing process has finished and the bales must be discharged. Disregarding the complicated construction, such indicating devices operate in a satisfactory manner. When the bale is discharged, the pressure chamber can be again closed. When the bale is located outside of the turning region of the rear turnable housing part, the bale can be damaged by the turnable housing part. For preventing this, it is known to provide a turnable discharge bracket for rolling the bales thereover. After this, the discharge bracket turns upwardly by a predetermined angle and prevents backrolling of the bales and their movement into the turning region of the rear housing part. In the case of ground unevenness or slopes it is however not guaranteed that the bales roll sufficiently far and the discharged bracket can turn upwardly. The tractor driver must therefore lift the tractor and to make sure that the rack is also sufficiently raised before starting the closing step.

SUMMARY OF THE INVENTION

Accordingly, it is an object of the present invention to provide a round baling press which avoids the disadvantages of the prior art.

More particularly, it is an object of the present invention to provide a round baling press which avoids damages during closing of a rear housing part, both in the sense of the bales and also in the sense of the press.

In keeping with these objects and with others which will become apparent hereinafter, one feature of the present invention resides, briefly stated, in a round baling press in which sensing means is provided in a free space between a discharged bale and a turning region of the rear housing part and release a switching step in the case of a sufficient distance of the bale from the press.

When a round baling press is designed in accordance with the present invention, it is guaranteed that the rear turnable housing part can be turned only when no bale is located in the turning region of the rear housing part.

The sensing means can release a check valve which is connected in an oil circulation circuit of two-cylinder and-piston units for turning the rear housing part, or produce or interrupt an acoustic or optical signal.

In accordance with another feature of the present invention, the rod is turnable in the discharge region of the finished bale by a rolling-out bale against the force of the spring, and an abutment displaceable by the rod acts upon a switch for the check valve.

In a structurally simple manner, the rod can be provided with a lever with a switching rod connected therewith and engaged by a pressing spring, wherein the pressing spring at one end is supported on a console which guides the switching rod and on the other end on an end disk fixedly connected with the end of the switching rod.

A further advantageous feature of the present invention is that the rod is turnable about a pin which, similarly to the console, is mounted on a machine-fixed carrier profile.

It is advantageous when a locking lever having an activating lever is turnably supported on the carrier profile and turns in the case of closed pressing chamber a pin mounted on the rear housing part against the force of the pulling spring so that a further pin connected with the locking lever acts upon the lever therefore upon the switching rod against the force of the pressing spring until the abutment of the switch is released.

An additional feature of the present invention is that with the upwardly turned rear housing part the pin is released under the action of the pulling spring of the lever and thereby the switching rod.

Advantageously, the length of the pulling spring is selected so that when the switching rod is in the released condition the abutment is movable against the switch.

For automatically performing the closing step of the housing, the sensing device can act directly or indirectly on a control valve.

The known features of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
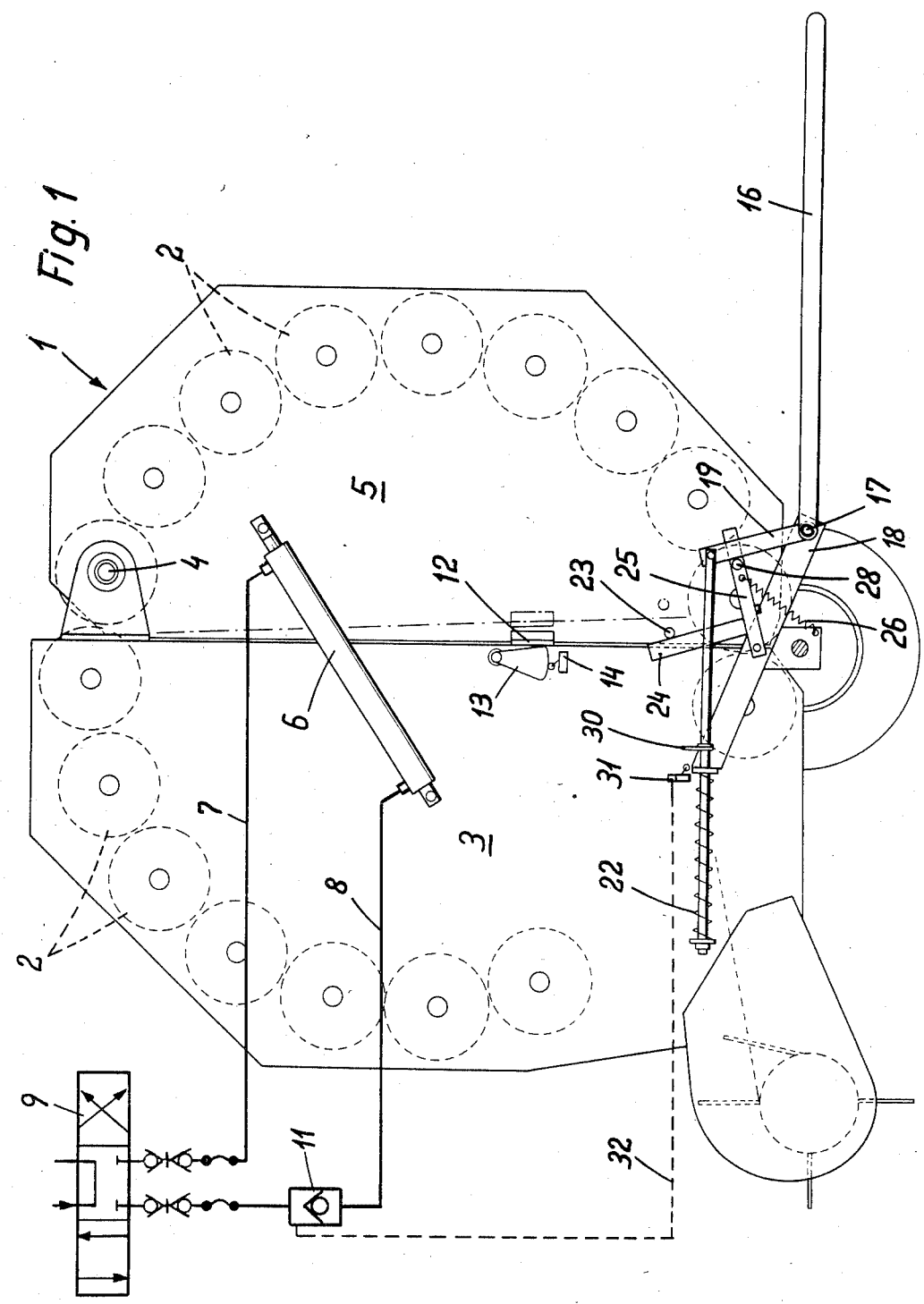
FIG. 1 is a side view of a round baling press in accordance with the present invention.

A round baling press in accordance with the present invention is identified as a whole with reference number 1. It has a pressing chamber housing which is provided at its periphery with a rotatable rollers 2 and includes a front housing part 3 which is fixed to the frame and bounds a front portion of the pressing chamber, and a rear housing part 5 which is pivotally connected with the front housing part 3 by an upper horizontal axle 4 and limits a rear portion of the pressing chamber.

The housing is provided at its both sides with a hydraulic cylinder-and-piston unit 6 which is articulately connected between the front and rear housing parts 3 and 5. A control medium such as oil is supplied via conduits 7 and 8 and a control valve 9 to the cylinder-and-piston unit 6 when needed. An electromagnetic check valve 11 is arranged in the conduit 8 and switched by a microswitch 31. As long as a bale is finally wound, it turns the rear housing part 5 about the axle 4 by a small distance outwardly, so that an abutment 12 of an actuating member 13 is released and a microswitch 14 of a tractor driver indicates for example by an acoustic signal that a bale is wound with the desired pressing density. The driver then actuates the valve 9 so that oil is supplied through the conduit 8 to the cylinder-and-piston unit 6 and at the other side of the piston the oil can discharge via the conduit 7. As a result, the rear housing part 5 is turned upwardly, so that the bale 15 can roll out of the roller baling press 1.

The bale rolls over a discharge bracket whose outer rod 16 is supported turnably about a pin 17, so as to provide an inclined discharged path for the bales 15. The pins 17 are connected with a machine-fixed carrier profile 18. At least one rod 16 has a lever 19 welded therewith and provided at its end facing away of the rod 16 with a switching rod 20. The switching rod 20 is guided in a console 21 connected with the carrier profile 18. The switching rod 20 is partially surrounded by a pressure spring 22 which is suported at one end on the console 21 and at the other end on an end disk 21' which is fixedly connected with the switching rod.

Figure 2:
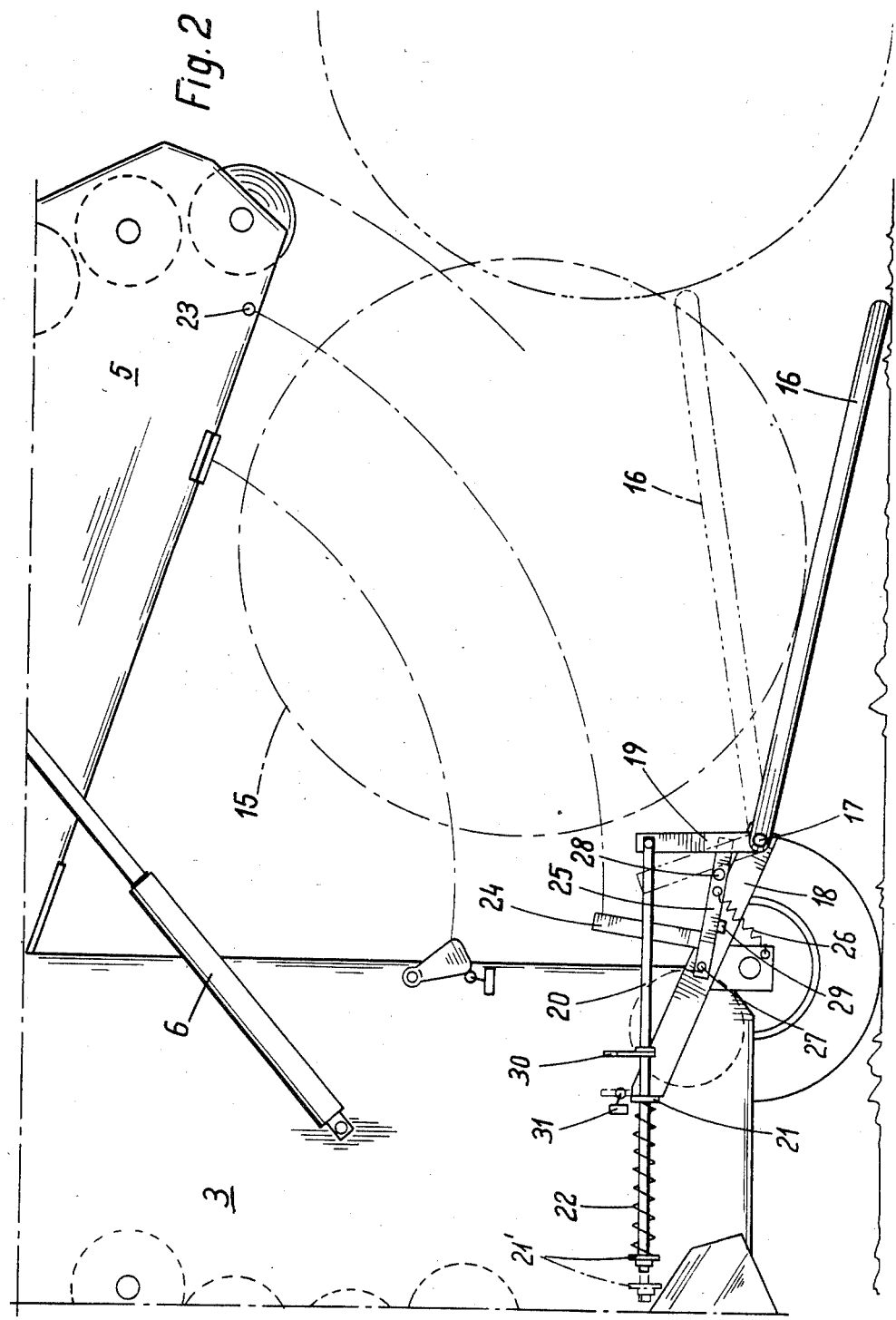
FIG. 2 is a view showing a part of the round baling press of FIG. 1, on an enlarged scale.

In the position shown in FIG. 1 a pin 23 of an actuating lever 24 of the rear housing part 5 presses a locking lever 25 against the force of a pulling spring 26 in a counter clockwise direction around a supporting point 27 until a pin 28 provided on the locking lever 25 abuts against the lever 19 which is held on the pin 28 by the pressing spring 22. In the position shown in FIG. 2 the pin 23 of the actuating lever 24 is released, so that the locking lever 25 abuts because of the pulling force of the spring 26 against an abutment 29 which is mounted on the carrier profile 18.

When the bale 15 is rolled from the rod 16, it is forcedly turned by the pressure spring 22 from its position shown in solid lines to its position shown in dash-dot lines, so that the bale 15 is prevented by the rod 16 or the respective rake from rolling back into the turning region of the rear housing part 5. Simultaneously with the upward turning of the rod 16, the lever 19, the abutment 30 and the end disk 23 are displaced to the position shown in broken lines. The abutment 30 actuates a microswitch 31 which releases via control conduit 32 the check valve 11 and moreover informs the tractor driver for example by an known acoustic or optical signal that the rear housing part 5 can be turned without danger toward the front housing part 3. After this both housing parts resume the position shown in FIG. 1.

Since during turning of the rear housing part 5 to the front housing part 3 the pin 23 of the lever 24 is turned in direction of the housing part 3 and since the pin 28 of the lever 19 is also turned about the pin 17, the spring 22 is again somewhat prestressed so that the rod 16 resumes a substantially horizontal position shown in FIG. 1. During this movement the abutment 30 is moved back from the switch 31. The winding of further bales is performed in an analogous manner.

It will be understood that each of the elements described above, or two or more together, may also find a useful aplication in other types of construction differing from the types described above.

While the invention has been illustrated and described as embodied in a round baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A round baling press for agricultural stalk products, comprising a housing forming a pressing chamber and including a stationary front housing part and a rear housing part turnable about a horizontal axis relative to said front housing part; a plurality of transporting elements arranged in said pressing chamber; hydraulic means arranged to move said rear housing part between a closed position in which it approaches said front housing part and closes said inner chamber, and a discharging position in which it is withdrawn from said front housing part and opens said inner chamber; and sensing means arranged to sense a free space between a discharged bale and a turning region of said rear housing part and releasing a switching step when the bale is at a sufficient distance from said housing, said sensing means including a check valve arranged in an oil circulation circuit of said hydraulic means, a pressure spring, a rod turnable in a discharge region of the finished bales by a rolling-out bale against the forces of said pressure spring, an abutment displaceable by said rod, and a switch actuated by said abutment for said check valve.

2. A round baling press as defined in claim 1, wherein said housing has two lateral sides, said hydraulic means including hydraulic cylinder-and-piston units each provided at a respective one of said sides of said housing.

3. A round baling press as defined in claim 1, wherein said rod has a lever and a switching rod articuately connected with said lever and engaged by said pressure spring; and further comprising a console which guides said switching rod and supports said pressure spring, and an end disk which is fixedly connected with said switching rod and also supports said pressure spring.

4. A round baling press as defined in claim 3; and further comprising a carrier profile, said console being mounted on said carrier profile, said rod being turnable about a pin which is also mounted on said carrier profile.

5. A round baling press as defined in claim 4; and further comprising a locking lever which is provided with an actuating lever and is turnably supported on said carrier profile, a pin connected with said locking lever, a pulling spring, and a further pin mounted on said rear housing part so that in said closed position of said pressing chamber said locking lever is turned against the force of said pulling spring by said further pin so that said first mentioned pin connected with said locking lever moves said first mentioned lever and thereby said switching rod against the force of said pressing spring until said abutment releases said switch.

6. A round baling press as defined in claim 5, wherein when said rear housing part is turned upwardly said first mentioned pin releases under the action of said pulling spring said first mentioned lever and thereby said switching rod.

7. A round baling press as defined in claim 3, wherein said pressing spring has such a length that with said switching rod in a released position said abutment is movable against said switch.

8. A round baling press as defined in claim 1, and further comprising a control valve for supplying said hydraulic means, said sensing means being arranged to directly act on said control valve.

* * * * *